(12) United States Patent
Krug et al.

(10) Patent No.: US 7,502,215 B2
(45) Date of Patent: Mar. 10, 2009

(54) SYSTEMS AND METHODS FOR DIRECTING A CURRENT

(75) Inventors: Florian Krug, Munich (DE); Stefan Brokfeld, Ochtrup (DE); Ralph Teichman, Albany, NY (US)

(73) Assignee: General Electric Company, Schenectady, NY (US)

( * ) Notice: Subject to any disclaimer, the term of this patent is extended or adjusted under 35 U.S.C. 154(b) by 381 days.

(21) Appl. No.: 11/283,433

(22) Filed: Nov. 18, 2005

(65) Prior Publication Data

US 2007/0114797 A1 May 24, 2007

(51) Int. Cl.
*H05F 3/02* (2006.01)
*H05F 3/04* (2006.01)

(52) U.S. Cl. .................. 361/220; 361/221; 361/117; 361/129; 290/44; 290/55

(58) Field of Classification Search .............. 361/220, 361/221, 117, 129; 290/44, 55
See application file for complete search history.

(56) References Cited

U.S. PATENT DOCUMENTS

| | | | | |
|---|---|---|---|---|
| 4,222,464 A | | 9/1980 | Moriya et al. | |
| 4,287,551 A | * | 9/1981 | Watanabe | 361/212 |
| 4,625,256 A | * | 11/1986 | Scuka et al. | 361/117 |
| 6,177,735 B1 | | 1/2001 | Chapman et al. | |
| 6,783,326 B2 | * | 8/2004 | Weitkamp et al. | 416/1 |
| 6,873,084 B2 | | 3/2005 | Richard | |
| 6,932,574 B2 | | 8/2005 | Wobben | |
| 7,249,935 B2 | * | 7/2007 | Pedersen | 416/146 R |
| 2004/0069573 A1 | * | 4/2004 | Anderson | 188/1.11 L |
| 2007/0009361 A1 | * | 1/2007 | Moller Larsen et al. | 416/146 R |

FOREIGN PATENT DOCUMENTS

| | | |
|---|---|---|
| WO | WO01/86144 A1 | 11/2001 |
| WO | WO03/054389 A1 | 7/2003 |
| WO | WO2004/001224 A1 | 12/2003 |
| WO | WO2004/044419 A1 | 5/2004 |
| WO | WO2005/031158 A2 | 4/2005 |
| WO | WO2005/057008 A1 | 6/2005 |

* cited by examiner

*Primary Examiner*—Michael J Sherry
*Assistant Examiner*—Zeev Kitov
(74) *Attorney, Agent, or Firm*—James McGinness, Esq.; Amrstrong Teasdale LLP

(57) ABSTRACT

A method for directing a current generated by a lightning striking a wind turbine is described. The method includes directing the current from a main shaft of the wind turbine to a brake disc attached to the shaft, and directing the current from the brake disc to one of a spark gap and a roller mechanism coupled to a down-conductor at a ground voltage.

14 Claims, 10 Drawing Sheets

SYSTEMS AND METHODS FOR DIRECTING A CURRENT

BACKGROUND OF THE INVENTION

This invention relates generally to a wind turbine and more particularly to methods and systems for directing a current within the wind turbine.

A rotor blade of a wind turbine is provided with an outer lightning down-conductor arranged on an outer surface of the blade or an inner lightning down-conductor inside the blade. The inner lightning down-conductor is provided with a lightning receptor, which is a metallic through-going connection between the inner lightning down-conductor of the blade and the outer surface of the blade. A purpose of the receptor is to attract lightning so that a lightning current generated from lightning can be guided downwards though the lightning down-conductor mounted inside the rotor blade.

Use of electrically conductive material in components, such as a brake pad, a generator, and bearings supporting the generator, within the wind turbine entails a need for lightning protection or overvoltage protection for the components. In an event of the lightning strikes to the rotor blade, there is a risk that a path of the current will propagate through the rotor blade and into the components to damage the components. It is important to protect the components from the current because the damage can lead to major costly repairs of the components.

BRIEF DESCRIPTION OF THE INVENTION

In one aspect, a method for directing a current generated by a lightning striking a wind turbine is described. The method includes directing the current from a main shaft of the wind turbine to a brake disc attached to the shaft, and directing the current from the brake disc to one of a spark gap and a roller mechanism coupled to a down-conductor at a ground voltage.

In another aspect, a method for directing a current generated by a lightning striking a wind turbine is described. The method includes directing the current from a hub of the wind turbine to a slip ring coupled to the hub, and directing the current from the slip ring to a down-conductor at a ground potential.

In yet another aspect, a wind turbine includes a main shaft, a brake disc attached to the main shaft, and one of a spark gap member and a roller mechanism configured to direct a current from the brake disc to a down-conductor within a tower of the wind turbine.

DETAILED DESCRIPTION OF THE INVENTION

Figure 1:
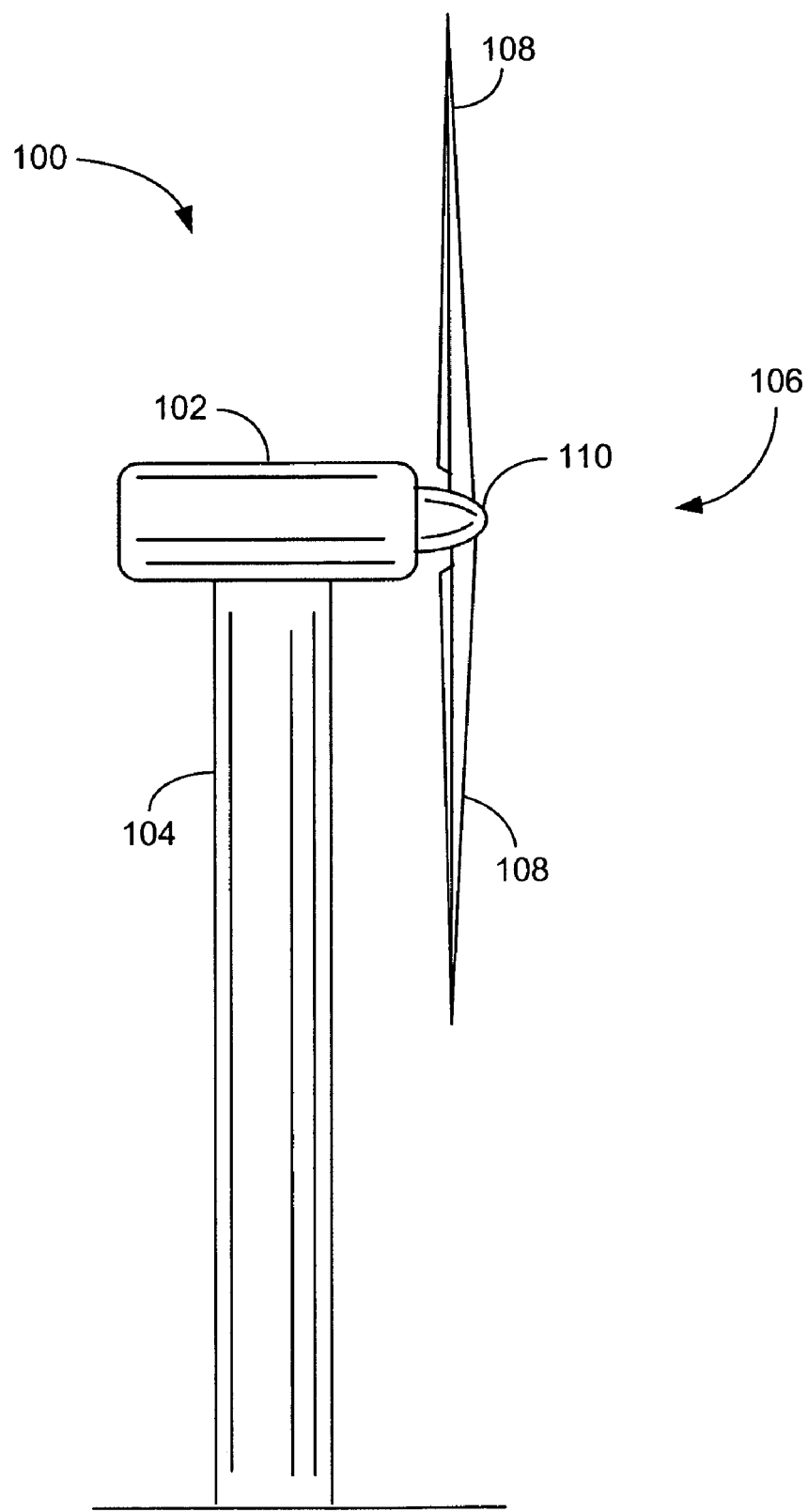
FIG. 1 is a diagram of an embodiment of a wind turbine.

FIG. 1 is a diagram of an embodiment of a wind turbine 100 including a nacelle 102, a tower 104, a rotor 106 having at least one rotor blade 108 and a rotating hub 110. Nacelle 102 is mounted atop tower 104, a portion of which is shown in FIG. 1. Rotor blades 108 are attached to hub 110.

Figure 2:
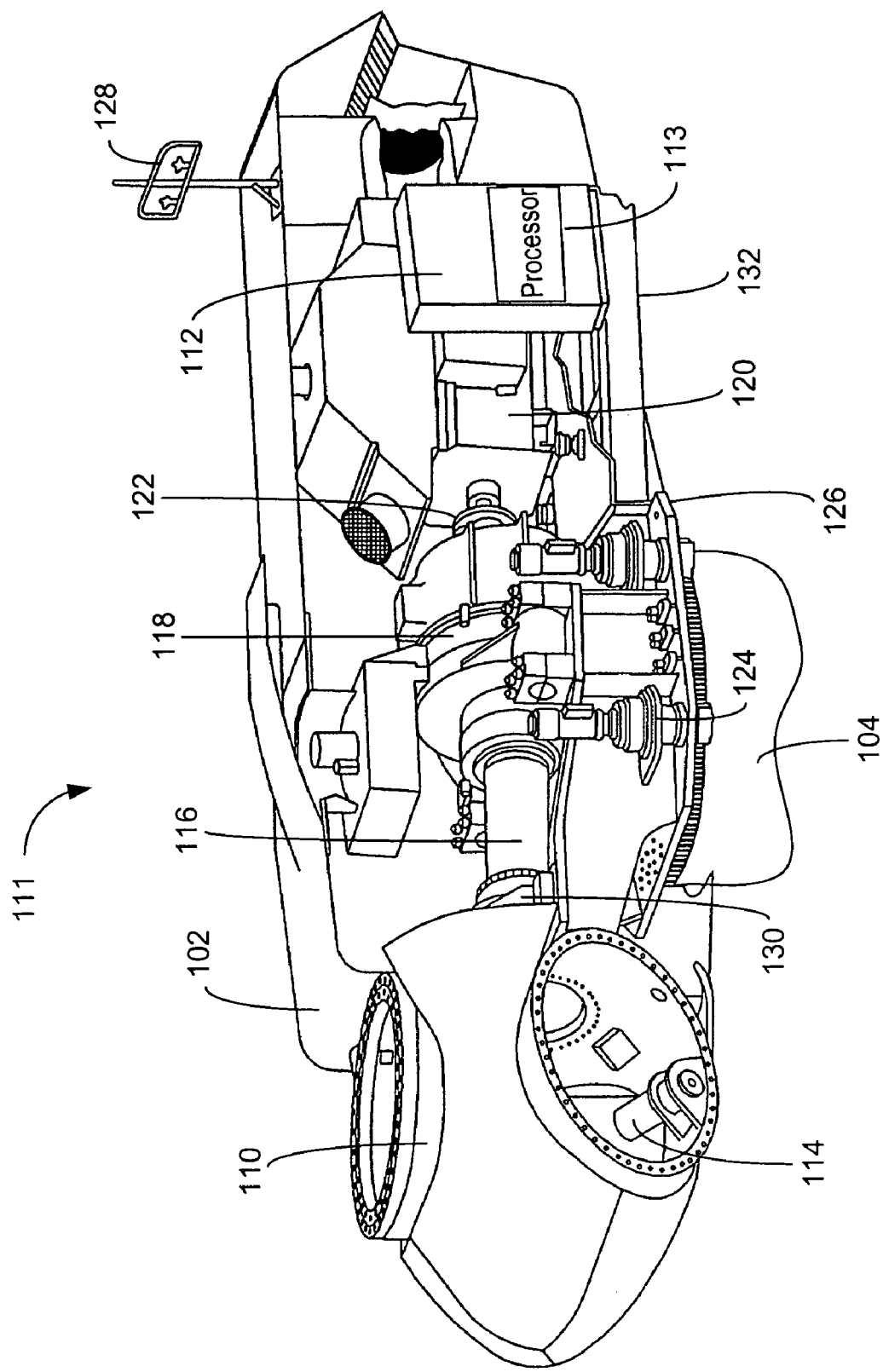
FIG. 2 is a diagram of an embodiment of a system including a nacelle, a tower, and a hub of the wind turbine of FIG. 1.

FIG. 2 is a diagram of an embodiment of a system 111 including nacelle 102, tower 104, and hub 110. Nacelle 102 houses a control panel 112 including a processor 113. As used herein, the term processor is not limited to just those integrated circuits referred to in the art as a processor, but broadly refers to a controller, a microcontroller, a microcomputer, a programmable logic controller, an application specific integrated circuit, and any other programmable circuit.

Hub 110 includes a variable blade pitch drive 114. Nacelle 102 also houses a portion of main rotor shaft 116, a gear box 118, a generator 120, and a coupling 122. A yaw drive 124 and a yaw deck 126 are housed within nacelle 102. A meteorological boom 128 is coupled to nacelle 102. Nacelle 102 further houses a main bearing 130 and a main frame 132. Processor 113 controls rotor 106 and components housed within nacelle 102.

Variable blade pitch drive 114 is provided to control a pitch of blades 108 that drive hub 110 as a result of wind. In an alternative embodiment, a plurality of pitches of blades 108 are individually controlled by blade pitch drive 114.

Main rotor shaft 116, which is a low speed shaft, is connected to hub 110 via main bearing 130 and is connected at an opposite end of shaft 116 to gear box 118. Main rotor shaft 116 rotates with a rotation of hub 110. Gear box 118 utilizes a dual path geometry to drive an enclosed high speed shaft. The high speed shaft is coupled to main rotor shaft 116 and rotates with a rotation of main rotor shaft 116. The high speed shaft operates at a higher speed than main rotor shaft 116. Alternatively, main rotor shaft 116 is coupled directly to generator 120. The high speed shaft is used to drive generator 120, which is mounted on main frame 132. A torque of rotor 106 is transmitted via coupling 122 to generator 120.

Yaw drive 124 and yaw deck 126 provide a yaw orientation system for wind turbine 100. Meteorological boom 128 provides information for processor 113 in control panel 112, and the information includes wind direction and/or wind speed.

A down-conductor within rotor blade 108 is coupled to main rotor shaft 116. If lightning strikes the down-conductor within rotor blade 108, a current generated from the lightning travels via the down-conductor to main rotor shaft 116.

Figure 3:
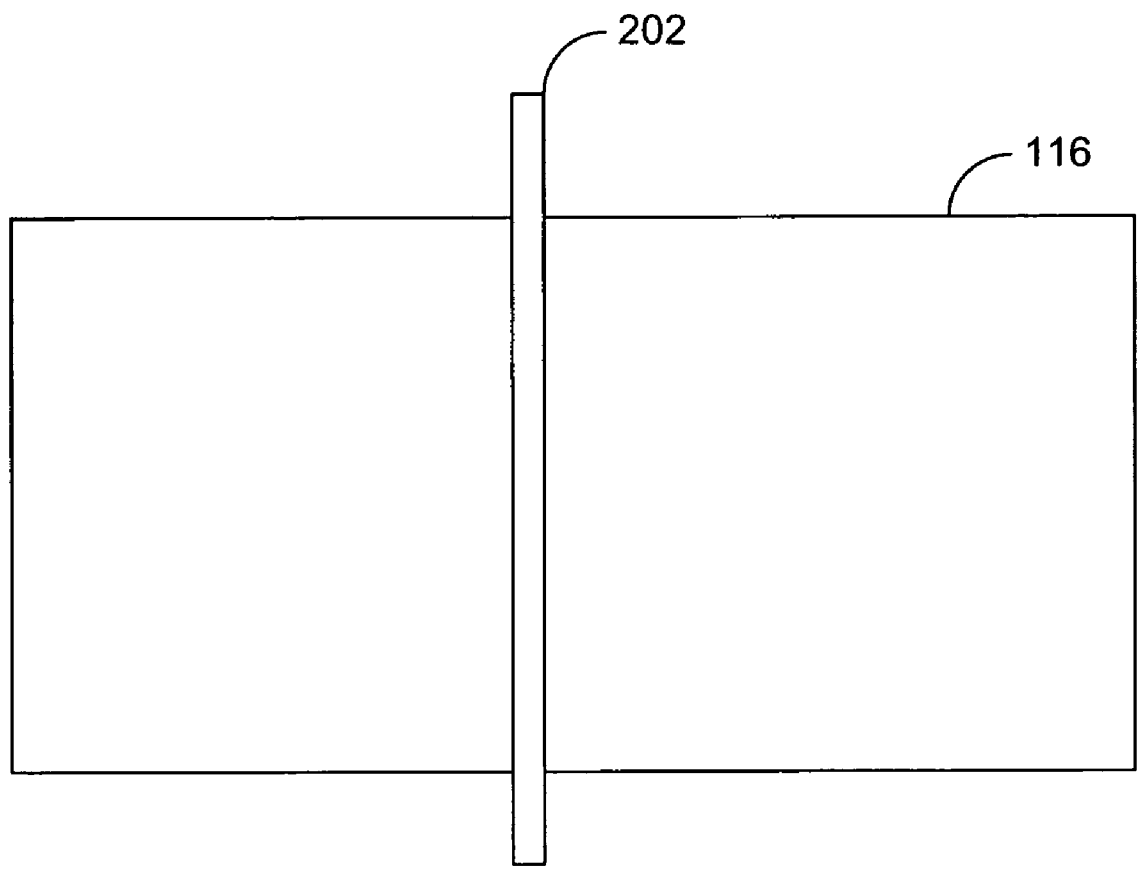
FIG. 3 is an embodiment of a main rotor shaft and a brake disc included within the wind turbine of FIG. 1.

FIG. 3 is an embodiment of main rotor shaft 116 and a brake disc 202 included within nacelle 102. Brake disc 202 surrounds main rotor shaft 116 and is attached to main rotor shaft 102. In an alternative embodiment, brake disc 202 surrounds the high speed shaft and is attached to the high speed shaft. Brake disc 202 rotates with a rotation of main rotor shaft 116. Main rotor shaft 116 receives the current from the down-conductor of rotor blade 108. The current from main rotor shaft 116 flows to brake disc 202. An insulation material, such as fiber glass and/or acetates, placed between gearbox 118 and generator 120 prevents the current from flowing from main rotor shaft 116 to generator 120.

Figure 4:
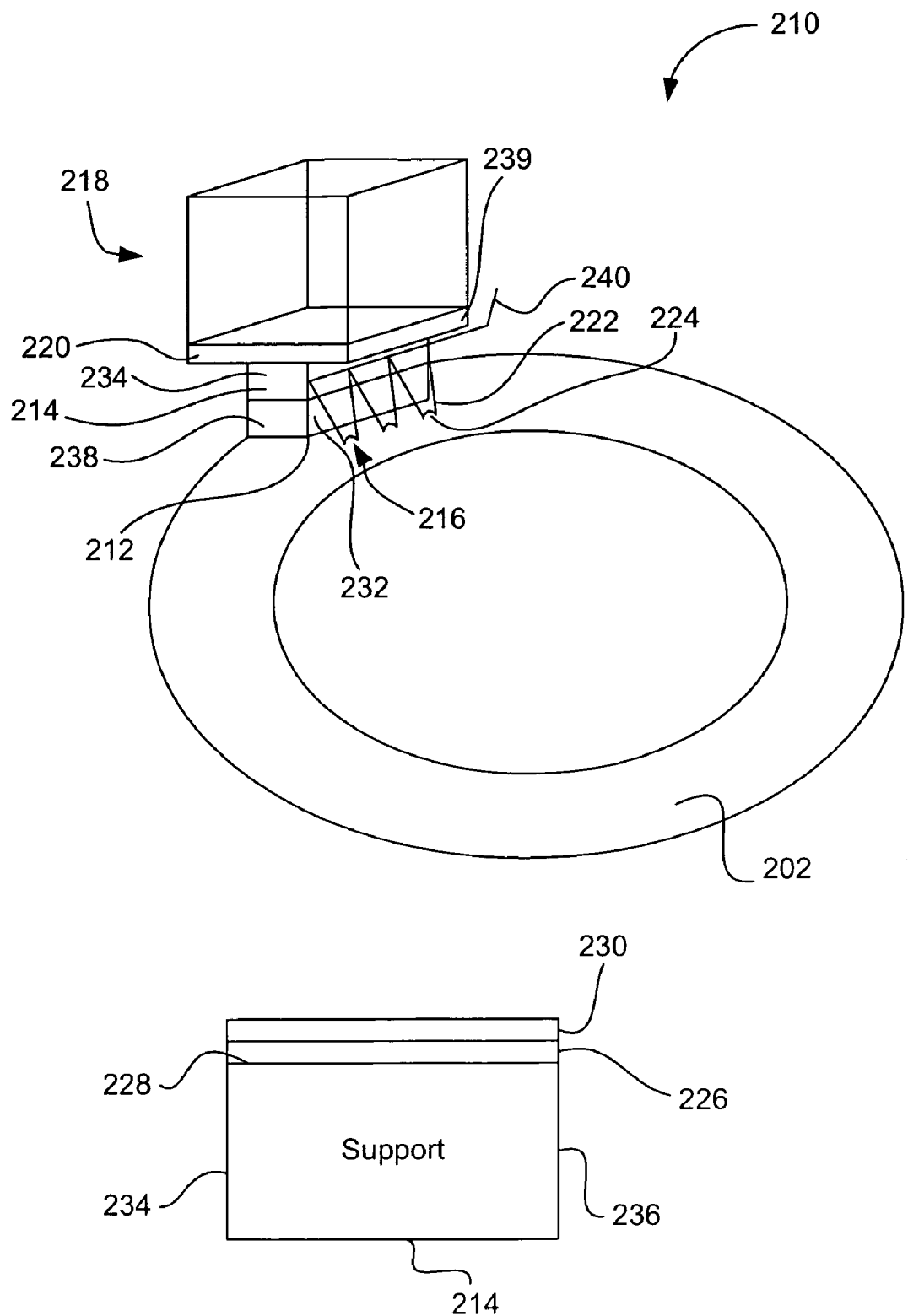
FIG. 4 shows an embodiment of a brake system included within the nacelle of FIG. 2.

FIG. 4 shows an embodiment of a brake system 210 included within nacelle 102. Brake system 210 includes brake disc 202 (FIG. 3), a brake pad 212, a support 214, such as a back plate, a spark gap member 216, and a hydraulic system 218, such as a hydraulic cylinder. Hydraulic system 218 includes a piston head 220. An example of spark gap member 216 includes a metal plate having a plurality of teeth 222. A spark gap 224 is formed between tooth 222 of spark gap member 216 and brake disc 202. An example of a shortest distance between tooth 222 and brake disc 202 includes a range of 1.5 millimeters-2.5 millimeters. Spark gap member 216 is attached, such as glued, to support 214 via an insulation layer 226 made of the insulation material. For example, insulation layer 226 covers a front face 228 of support 214. Front face 228 of support 214 faces spark gap member 216. A layer 230 of glue is formed on insulation layer 226 and spark gap member 216 is glued to insulation layer 226 by layer 230 of glue. In an alternative embodiment, insulation layer 226 covers front face 228 of support 214 and a front face 232 of brake pad 212. Front face 232 of brake pad 212 faces spark gap member 216. In yet another alternative embodiment, insulation layer 226 covers front face 228 and a plurality of side faces 234 and 236 of support 214. Side face 236 is not visible in FIG. 4. In still another alternative embodiment, insulation layer 226 covers front face 232 and a plurality of side faces 238 of brake pad 212. One side face 238 of brake pad 212 is visible in FIG. 4. The other side face 238 of brake pad 212 opposite to the visible side face 238 is not visible in FIG. 4. In another alternative embodiment, insulation layer 226 covers a front face of piston head 220. The front face 239 of piston head 220 faces spark gap member 216. Front face 239 is parallel to front faces 228 and 232.

Support 214 is attached to brake pad 212 and supports brake pad 212. Piston head 220 of hydraulic system 218 protrudes to apply a force against support 214. Application, by piston head 220, of the force rubs brake pad 212 against brake disc 202. Brake pad 212 applies friction against brake disc 202 when piston head 220 applies the force on support 214. Alternatively, piston head 220 retracts to reduce the force applied on support 214. The reduction of the force decreases the friction applied to brake disc 202 by brake pad 212.

As a voltage of the current in brake disc 202 increases beyond a threshold, such as greater than 30 kilovolts per centimeter of brake disc 202, air within spark gap 224 is ionized and the current flows from brake disc 202 via spark gap 224 to spark gap member 216. The current from spark gap member 216 flows to a conductor 240 that is attached, such as soldered to spark gap member 216. Conductor 240 is also attached, such as soldered, to a down-conductor within tower 104. Insulation layer 226 prevents the current from flowing from spark gap member 216 to support 214 and brake pad 212. The current from conductor 240 flows to the down-conductor within tower 104 to ground.

Figure 5:
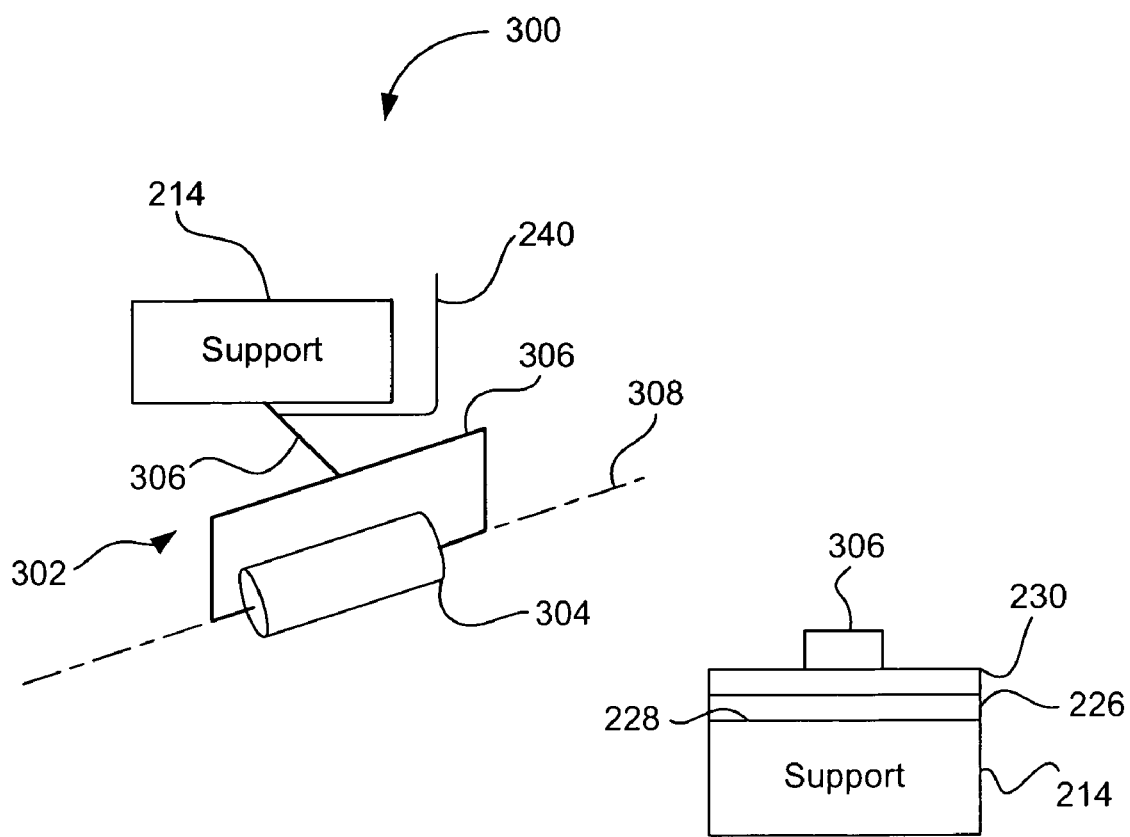
FIG. 5 is a block diagram of an embodiment of a system for directing a current within the turbine of FIG. 1.

FIG. 5 is a block diagram of an embodiment of a system 300 for directing the current. System 300 includes a roller mechanism 302 and support 214 (FIG. 4). Roller mechanism 302 includes a metal roller 304 and a metal bearing 306. Bearing 306 is attached, such as glued, to support 214 via insulation layer 226. For example, insulation layer 226 covers front face 228 of support 214, layer 230 of glue is formed on insulation layer 226, and bearing 306 is glued via layer 230 of glue to insulation layer 226. Roller 304 is supported by bearing 306 and rotates on an axis 308 that longitudinally passes through roller 304.

Roller 304 rotates on axis 308 during a rotation of brake disc 202. The current from brake disc 202 flows via roller 304 to bearing 306. Insulation layer 226 prevents the current from flowing from bearing 306 to support 214 and brake pad 212 (FIG. 4). The current flows from bearing 306 to conductor 240 that is attached, such as soldered, to bearing 306. The current flows from conductor 240 to the down-conductor within tower 104.

Figure 6:
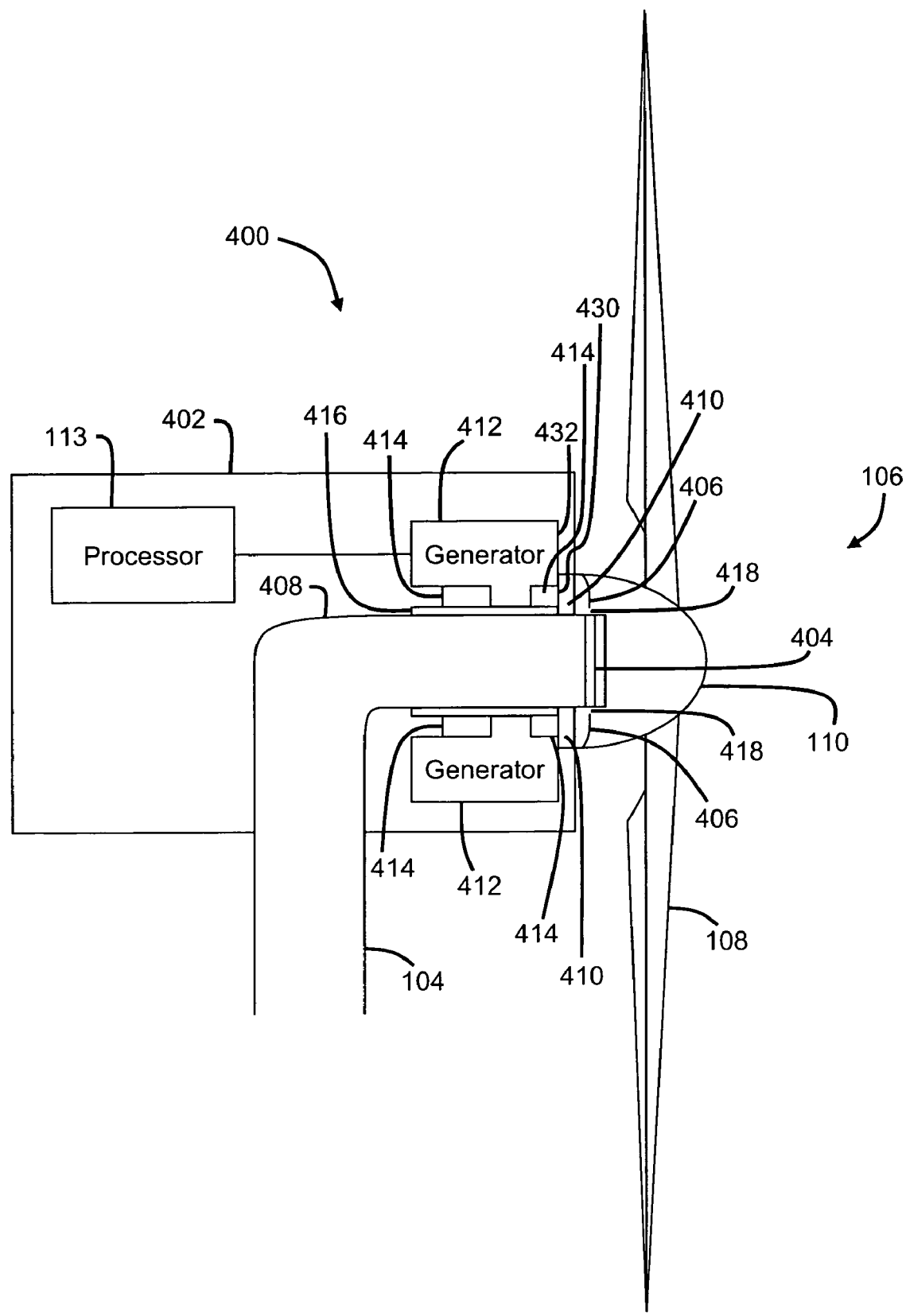
FIG. 6 is a block diagram of an embodiment of a direct drive wind turbine.

FIG. 6 is a block diagram of an embodiment of a direct drive wind turbine 400. Direct drive wind turbine 400 includes rotor 106, a nacelle 402, a slip ring 404, a plurality of spark gap members 406, an insulation tube 408 made of the insulation material, an insulation layer 410, and tower 104. In an alternative embodiment, direct drive wind turbine 400 includes more than two spark gap members 406. In yet another alternative embodiment, direct drive wind turbine 400 includes a single spark gap member 406. Nacelle 402 includes a direct drive generator 412, a plurality of bearings 414, a rotary shaft 416, and processor 113. Direct drive wind turbine 400 does not include gear box 118. Insulation tube 408 is made of the insulation material. Insulation layer 410 is formed between hub 110 and direct drive generator 412 to electrically isolate direct drive generator 412 from hub 110. Insulation layer 410 is also formed between bearing 414 and hub 110 to electrically isolate bearing 414 from hub 110. Insulation layer 410 is formed on a face 430, of bearing 414 and on a face 432, of generator 412. Faces 430 and 432 face hub 110. Each spark gap member 406 is attached, such as clamped, bolted, or glued, to a surface inside nacelle 402. A spark gap 418, including a shortest distance in the range of 2.5-3.5 millimeters, is formed between spark gap member 406 and slip ring 404. Slip ring 404 is mounted on insulation tube 408. Rotary shaft 416 surrounds insulation tube 408 and is concentric with insulation tube 408. Insulation tube 408 extends from within hub 110 to tower 104. Insulation tube 408 includes a conductor. Slip ring 404 is attached, such as soldered, to the conductor within insulation tube 408 and the conductor within insulation tube 408 is attached, such as soldered, to the down-conductor within tower 104.

Direct drive wind turbine 400 employs rotor 106 connected via rotary shaft 416 to direct drive generator 412. Rotary shaft 416 rotates with rotor 106. Rotary shaft 416 is supported by a plurality of bearings, such as bearing 306 (FIG. 5) attached, such as clamped, to insulation tube 408. The bearings on which rotary shaft 416 is supported are attached to a plurality of rollers, such as roller 304 (FIG. 5), that allow rotary shaft 416 to rotate with respect to insulation tube 416. Direct drive wind turbine 400 has a variable-speed configuration, which employs processor 113 to control direct drive generator 412 and to convert a variable-voltage, variable-frequency power of direct drive generator 412 to a standard utility voltage and frequency. Rotational energy of rotor blade 108 is transferred via hub 110 to a rotor of direct drive generator 412 that produces electricity.

The current from hub 110 flows to spark gap member 406. When the voltage generating the current in spark gap member 406 is above a specific amount, such as greater than 30 kilovolts per centimeter of spark gap member 406, the current flows via spark gap 418 to slip ring 404. Insulation layer 410 prevents the current from flowing from spark gap member 406 to bearings 414, direct drive generator 412, and rotary shaft 416. The current flows from slip ring 404 to the conductor within insulation tube 408. Insulation tube 408 prevents the current from flowing from the conductor within insulation tube 408 to rotary shaft 416. The current from the conductor within insulation tube 408 flows to the down-conductor within tower 104 and further to ground.

Figure 7:
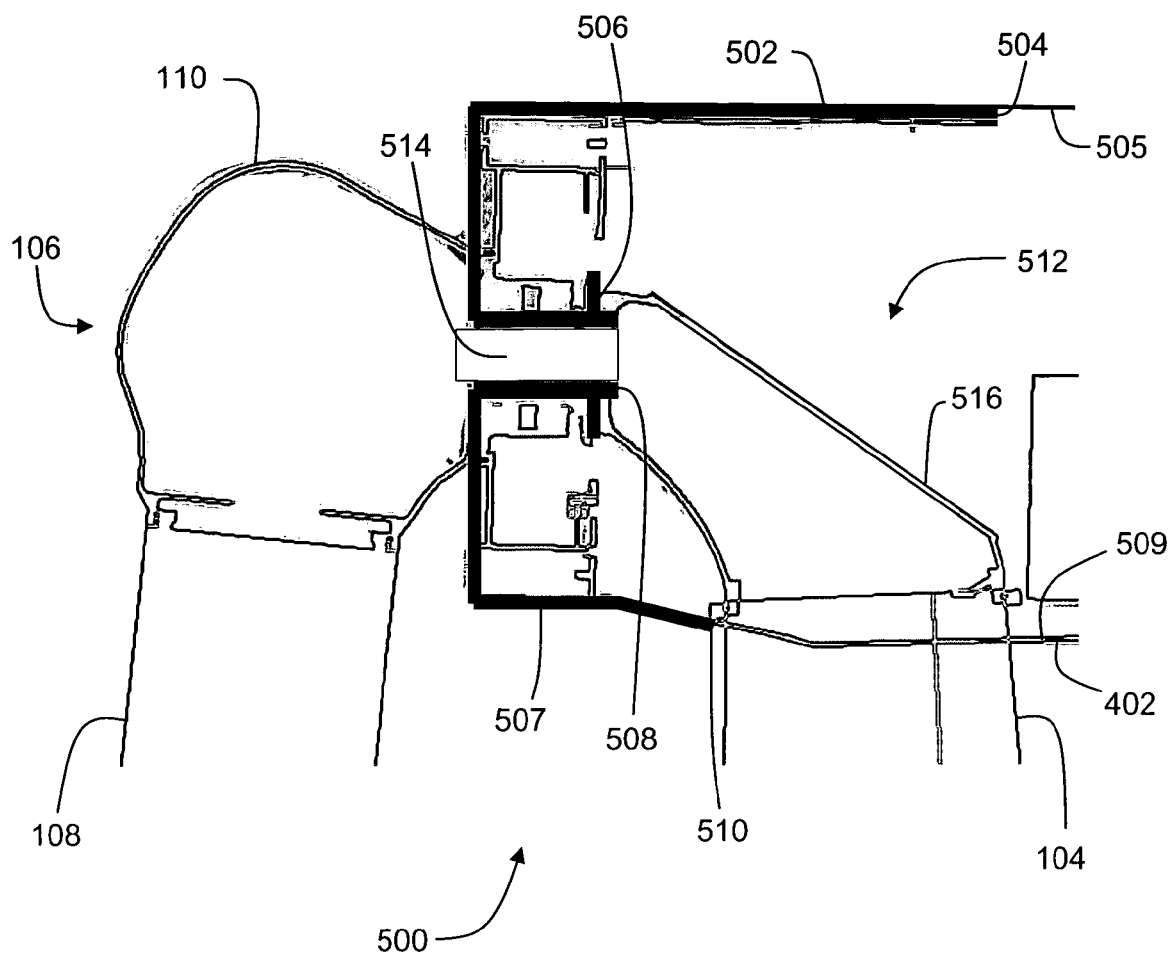
FIG. 7 is a diagram of another embodiment of a direct drive wind turbine.

FIG. 7 is a diagram of an embodiment of a direct drive wind turbine 500. Direct drive wind turbine 500 includes rotor 106, nacelle 402, and tower 104. Direct drive wind turbine 500 includes the same components as that of direct drive wind turbine 400 except that direct drive wind turbine 500 includes an insulation layer 502, made of the insulation material, extending from a point 504 on a surface 505 inside nacelle 402 to a point 506 on surface 505 inside nacelle 402 and further includes an insulation layer 507 extending from a point 508 on a surface 509 inside nacelle 402 to a point 510 on surface 509. Moreover, an insulation tube 512 located within direct drive wind turbine 500 is the same as insulation tube 408 except insulation tube 512 includes a first portion 514 and a second portion 516. First portion 514 has a smaller diameter than a diameter of second portion 516 and is attached, such as glued, to second portion 516. First portion 514 includes a conductor and second portion 516 includes a conductor. Slip ring 404 (FIG. 6) is attached, such as soldered, to the conductor within first portion 514. The conductor within first portion 514 is attached, such as soldered, to the conductor within second portion 516. The conductor within second portion 516 is attached, such as soldered, to the down-conductor within tower 104. In an alternative embodiment, insulation tube 512 includes a third portion attached, such as glued, to second portion 516 and tower 104. A conductor within the third portion is attached, such as soldered, to the conductor within second portion 516 and the conductor within the third portion is attached, such as soldered, to the down-conductor within tower 104. Rotary shaft 416 surrounds first portion 514 and does not surround first portion 514. Rotary shaft 416 is supported by a plurality of bearings, such as bearing 306 (FIG. 5) attached, such as clamped, to first portion 514. The bearings on which rotary shaft 416 is supported are attached to a plurality of rollers, such as roller 304 (FIG. 5), that allow rotary shaft 416 to rotate with respect to first portion 514.

The current flows within direct drive wind turbine 500 in the same manner as that in direct drive wind turbine 400 except that the current flows from slip ring 404 to the conductor within first portion 514, the current flows from the conductor within first portion 514 to the conductor within second portion 516, and the current flows from the conductor within second portion 516 to the down-conductor within tower 104. If the third portion is included, the current flows from the conductor within second portion 516 to the conductor within the third portion and the current from the third portion flows to the down-conductor within tower 104. Insulation layers 502 and 507 prevent the current from flowing from hub 110 to bearings 414 and direct drive generator 412 within nacelle 402.

Figure 8:
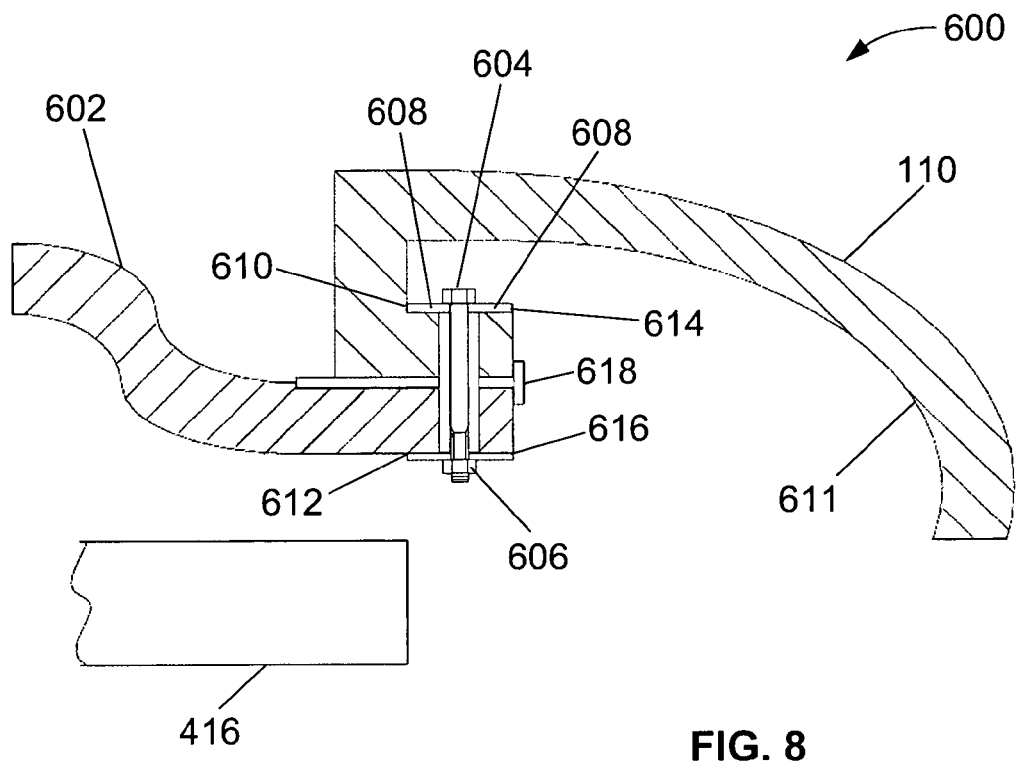
FIG. 8 shows a half view of an embodiment of a system for directing the current.

FIG. 8 shows a half view of an embodiment of a system 600 for directing the current. The other half view of the embodiment of system 600 that is not shown is the same as the half view of the embodiment of system 600 that is shown. System 600 includes hub 110, a generator base 602 located within nacelle 402 and on which direct drive generator 412 is mounted, rotary shaft 416, a screw 604, and a nut 606. Hub 110 is bolted via screw 604 and nut 606 to generator base 602 under which bearings 414 (FIG. 6) are located. A plurality of insulation layers 608 made of the insulation material is formed between screw 604 and hub 110, between screw 604 and generator base 602, and between nut 606 and generator base 602. Insulation layer 608 extends from a point 610 on a surface 611 inside hub 110 to a point 612 on generator base 602. Insulation layer 608 extends from a point 614 on surface 611 inside hub 110 to a point 616 of generator base 602. An insulation layer 618 made of the insulation material is formed between hub 110 and generator base 602. Insulation layers 608 prevent the current from flowing from hub 110 to screw 604 and to nut 606, and insulation layer 618 prevents the current from flowing from hub 110 to generator base 602.

Figure 9:
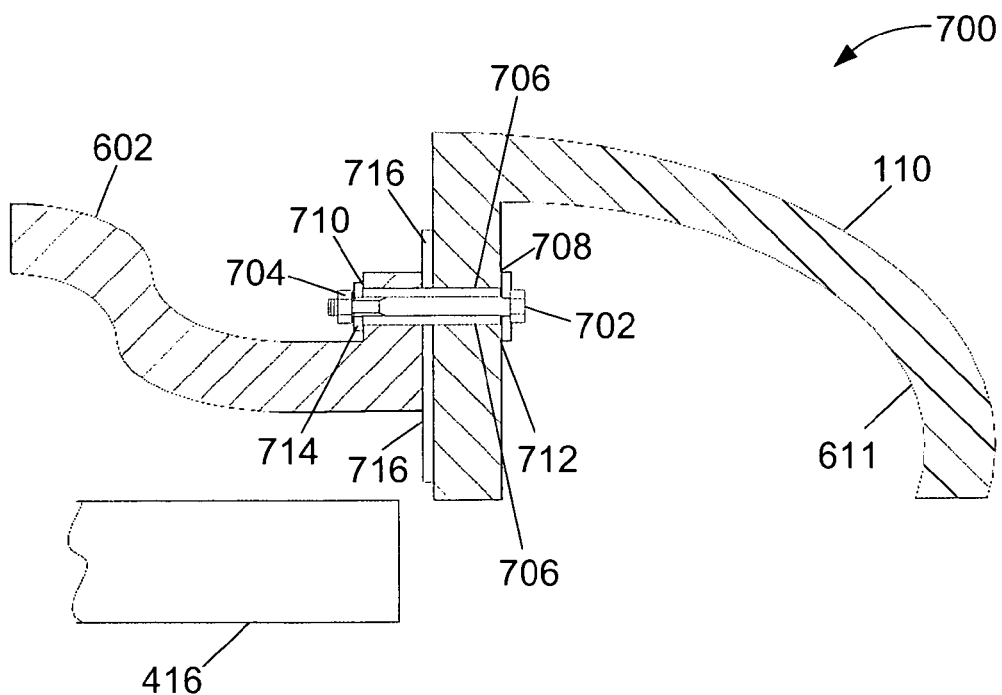
FIG. 9 shows a half view of another embodiment of a system for directing the current.

FIG. 9 shows a half view of an embodiment of a system 700 for directing the current. The other half view of the embodiment of system 700 that is not shown is the same as the half view of the embodiment of system 700 that is shown. System 700 includes generator base 602, hub 110, rotary shaft 416, a screw 702, and a nut 704. Hub 110 is bolted to generator base 602 by screw 702 and nut 704. A plurality of insulation layers 706 made of the insulation material is formed between screw 702 and hub 110, nut 704 and generator base 602, and screw 702 and generator base 602. Insulation layer 706 extends from a point 708 on surface 611 to a point 710 on generator base 602. Insulation layer 706 extends from a point 712 on surface 611 to a point 714 on generator base 602. An insulation layer 716 made of the insulation material is formed between hub 110 and generator base 602. Insulation layer 716 prevents the current from flowing from hub 110 to generator base 602, and insulation layers 706 prevent the current from flowing from hub 110 to screw 702 and to nut 704.

Figure 10:
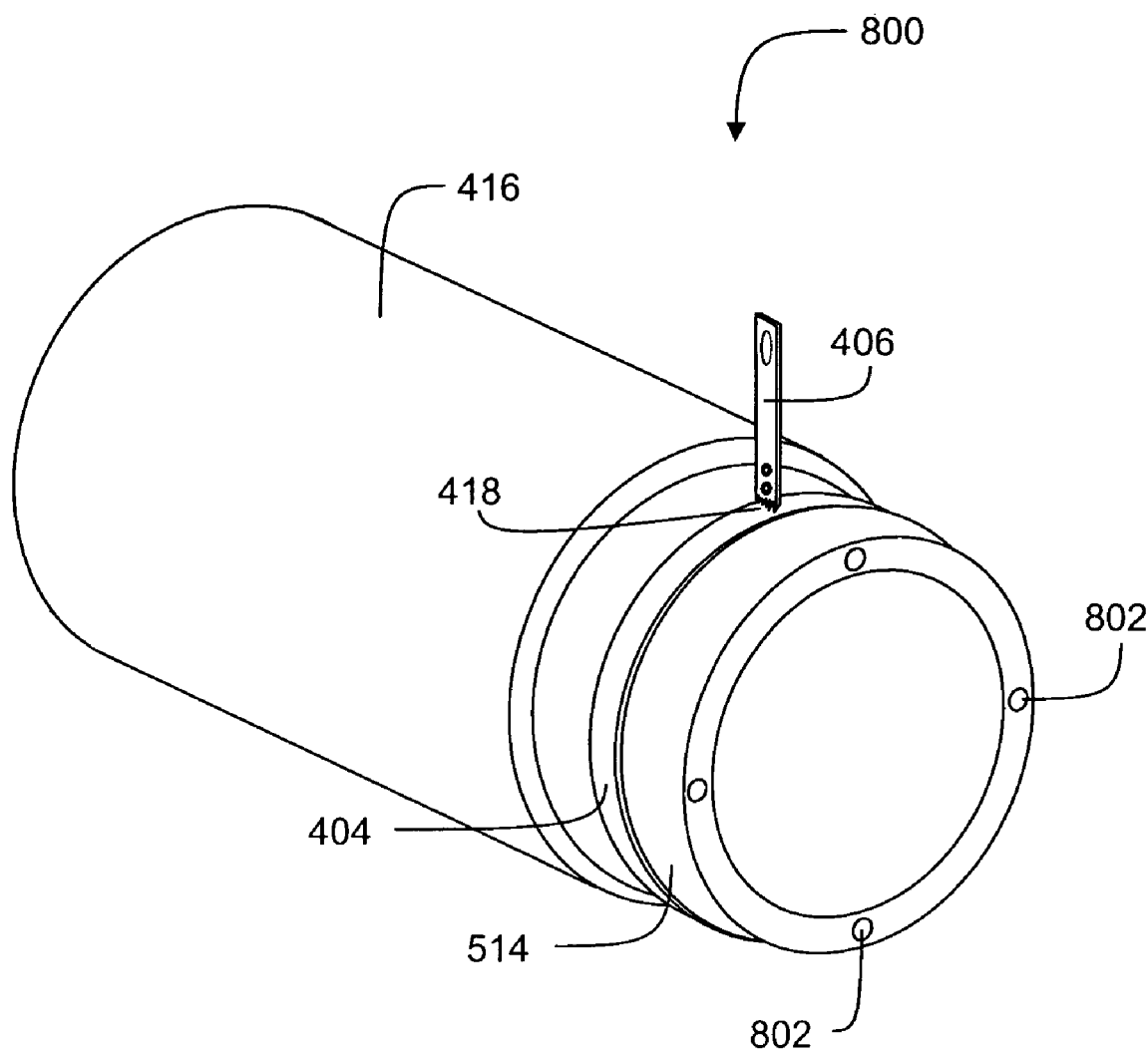
FIG. 10 is a diagram of an embodiment of a system for directing the current.

FIG. 10 is a diagram of an embodiment of a system 800 for directing the current. System 800 includes rotary shaft 416, first portion 514, spark gap member 406, and slip ring 404. A plurality of conductors 802 are embedded within first portion 514. Slip ring 404 surrounds first portion 514 and forms a tight fit with first portion 514. The tight fit is formed to prevent rotation of slip ring 404. Slip ring 404 is attached, such as soldered, to conductors 802 within first portion 514. The current from spark gap member 406 flows via spark gap 418 when the voltage generating the current within spark gap member 406 is above the specific amount. The current flows from spark gap member 406 via spark gap 418 to slip ring 404. The current flows from slip ring 404 to conductor 802. The current flows from conductor 802 to the conductor within second portion 516.

Figure 11:
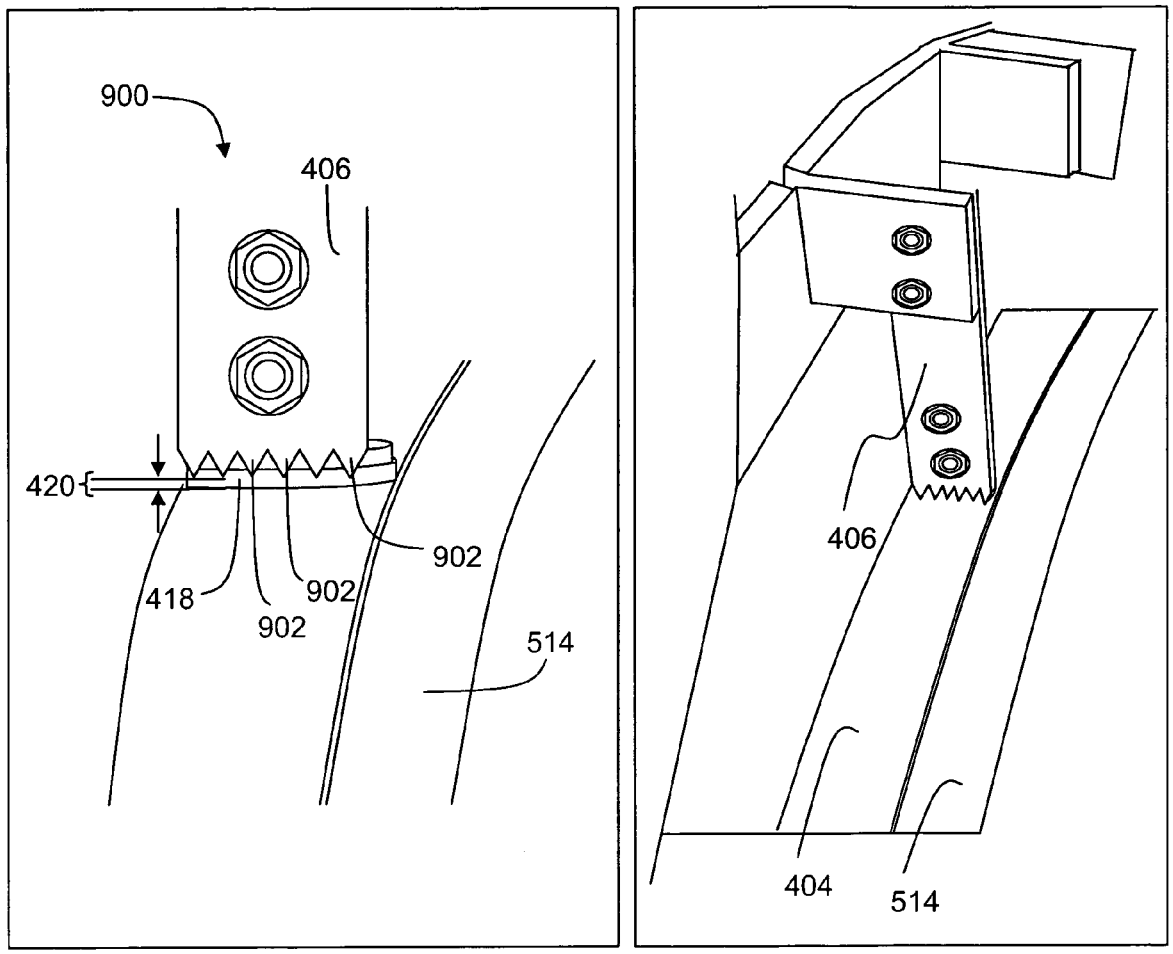
FIG. 11 is a diagram of an embodiment a system for directing the current.

FIG. 11 is a diagram of an embodiment a system 900 for directing the current. System 900 includes spark gap member 406, spark gap 418, slip ring 404, and first portion 514. Spark gap member 406 includes a plurality of teeth 902. Spark gap 418 includes a shortest distance 420 between teeth 902 and first portion 514. The current flows from spark gap member 406 via spark gap 418 to slip ring 404 when the voltage generating the current within spark gap member 406 is above the specific amount.

Technical effects of the systems and methods for directing the current include preventing the current from flowing from brake disc 202 (FIG. 4) to brake pad 212 (FIG. 4) and hydraulic system 218 (FIG. 4). If the current flows to brake pad 212 and hydraulic system 218, the current may interfere within properties of oil within hydraulic system 218 and may damage brake pad 212. Other technical effects of the systems and methods for directing the current include preventing the current from flowing from hub 110 to direct drive generator 412 (FIG. 6), bearings 414 (FIG. 6), and rotary shaft 416 (FIG. 6). If the current flows to direct drive generator 412, rotary shaft 416, and bearings 414, the current may damage bearings 414 and rotary shaft 416, and interfere with an operation of direct drive generator 412.

While the invention has been described in terms of various specific embodiments, those skilled in the art will recognize that the invention can be practiced with modification within the spirit and scope of the claims.

What is claimed is:

1. A method for directing a current generated by a lightning striking a wind turbine, said method comprising:

directing the current from a main shaft of the wind turbine to a brake disc attached to the shaft; and directing the current from the brake disc to one of a spark gap and a roller mechanism coupled to a down-conductor at a ground voltage.

2. A method in accordance with claim 1 further comprising:
coupling one of the spark gap and the roller mechanism to a support attached to a brake pad configured to apply friction to a motion of the brake disc.

3. A method in accordance with claim 1 wherein the roller mechanism comprises a roller supported by a bearing, said method further comprising:
coupling the bearing to the support; and
rotating the roller during a rotation of the brake disc.

4. A method in accordance with claim 1 further comprising creating the spark gap between a spark gap member and the brake disc.

5. A method in accordance with claim 1 further comprising preventing the current from reaching the brake pad by insulating the brake pad.

6. A method in accordance with claim 1 further comprising:
preventing the current from reaching the brake pad by insulating the brake pad, wherein said insulating the brake pad comprises covering at least a portion of the brake pad with an insulation layer impermeable to the current with a voltage level greater than thirty kilovolts per centimeter of the brake disc.

7. A method in accordance with claim 1 further comprising coupling a conductor to one of a spark gap member configured to create the spark gap and the roller mechanism.

8. A method in accordance with claim 1 wherein the roller mechanism comprises a roller supported by a bearing, said method further comprising:
coupling the bearing to a conductor; and
rotating the roller during a rotation of the brake disc.

9. A wind turbine comprising:
a main shaft;
a brake disc attached to said main shaft; and
one of a spark gap member and a roller mechanism configured to direct a current from said brake disc to a down-conductor within a tower of said wind turbine.

10. A wind turbine in accordance with claim 9 further comprising:
a brake pad configured to apply friction to a motion of said brake disc; and
a support attached to said brake pad and to one of said spark gap member and said roller mechanism.

11. A wind turbine in accordance with claim 9 further comprising:
a brake pad configured to apply friction to a motion of said brake disc; and
a support attached to said brake pad, wherein said roller mechanism comprises a roller and a bearing supporting said roller, said roller configured to rotate during a rotation of said brake disc, and said bearing attached to said support.

12. A wind turbine in accordance with claim 9 further comprising:
a brake pad configured to apply friction to a motion of said brake disc; and
an insulation material configured to prevent the current from reaching said brake pad by insulating said brake pad.

13. A wind turbine in accordance with claim 9 further comprising:
a brake pad configured to apply friction to a motion of said brake disc; and
an insulation material configured to cover at least a portion of the brake pad, said insulation material impermeable to the current with a voltage level greater than thirty kilovolts per centimeter of said brake disc.

14. A wind turbine in accordance with claim 9 further comprising a conductor coupled to one of said spark gap member and said roller mechanism.

* * * * *